United States Patent [19]

Rampen

[11] Patent Number: 4,694,849
[45] Date of Patent: Sep. 22, 1987

[54] HYDRAULIC CONTROL VALVES

[76] Inventor: William H. S. Rampen, R.R. No. 1, Oakville, Ontario, Canada, L6J 4Z2

[21] Appl. No.: 859,787

[22] Filed: May 5, 1986

Related U.S. Application Data

[63] Continuation-in-part of Ser. No. 633,504, Jul. 23, 1984, abandoned.

[51] Int. Cl.$^4$ .................. F16K 11/083; F15B 9/08
[52] U.S. Cl. ..................... 137/312; 137/625.23; 137/625.24; 91/375 A; 91/375 R; 251/283; 251/309
[58] Field of Search ............ 137/246, 246.11, 246.12, 137/625.21, 625.22, 625.23, 625.24, 312; 91/375 A, 375 R; 251/283, 309

[56] References Cited

U.S. PATENT DOCUMENTS

| | | | |
|---|---|---|---|
| 2,079,774 | 5/1937 | Shipley | 251/283 |
| 3,110,322 | 11/1963 | Bozoyan | 137/625.23 |
| 3,296,939 | 1/1967 | Eddy | 74/388 PS |
| 3,296,940 | 1/1967 | Eddy et al. | 137/625.24 |
| 3,404,704 | 10/1968 | Adams | 137/625.22 |
| 4,272,056 | 6/1981 | Komamura et al. | 137/625.22 |
| 4,335,745 | 6/1982 | Bouveret et al. | 137/625.22 |
| 4,387,737 | 6/1983 | Tobiasz | 137/625.21 |
| 4,428,399 | 1/1984 | Masuda et al. | 137/625.22 |

Primary Examiner—George L. Walton
Attorney, Agent, or Firm—Ridout & Maybee

[57] ABSTRACT

A hydraulic valve has a tapered plug rotatable in a complementary tapered bore in a stationary housing so that the axial position of the plug controls the magnitude of a leakage path between the two parts. The magnitude of the leakage path is sensed and used to control the axial position of the plug in a negative feedback arrangement so that the valve plug floats on a film of escaping hydraulic fluid and can be readily rotated by a low power actuator. Ports in the stationary member and passages in the plug are arranged so that both static and preferably also dynamic and hydraulic forces acting on the plugs are balanced. The valve is contained in a closed housing, preferably together with the actuator.

16 Claims, 8 Drawing Figures

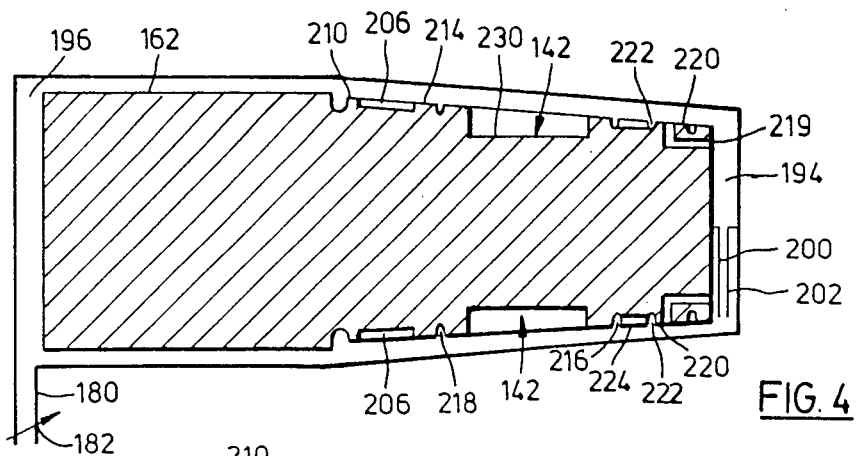
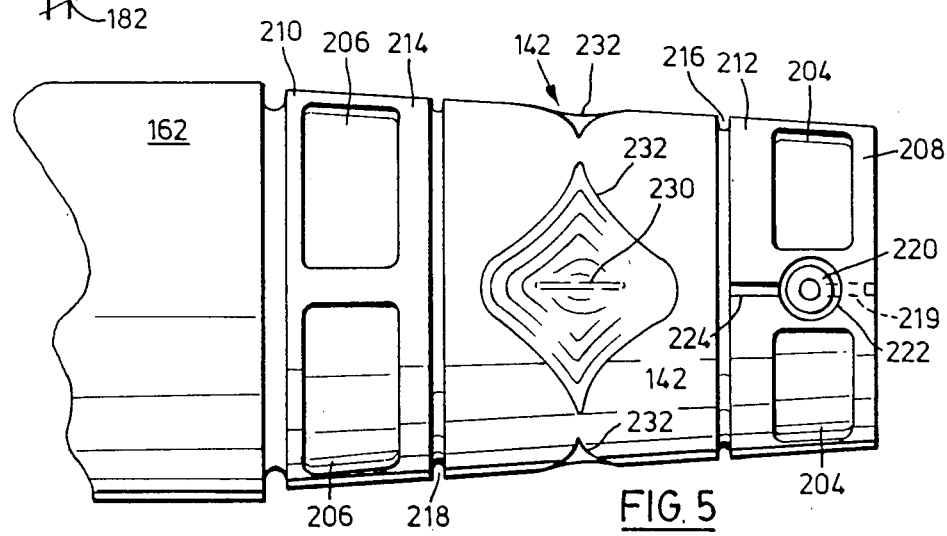
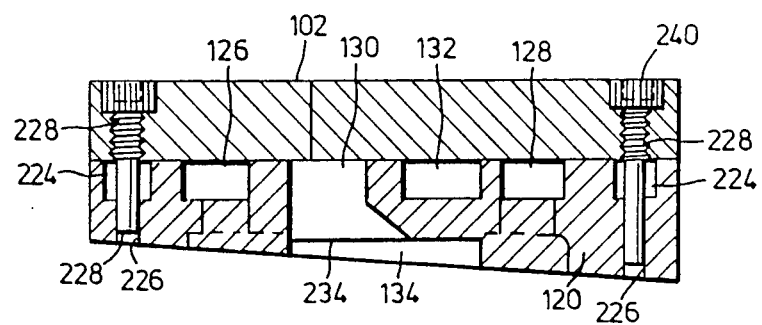

HYDRAULIC CONTROL VALVES

This application is a continuation-in-part of my copending patent application Ser. No. 633,504 filed July 23, 1984 now abandoned.

This invention relates to control valves for use in hydraulic systems, of the type in which an external mechanical or electrical control signal is translated into a change in the path or magnitude of flow of hydraulic fluid i.e. the valve performs a hydrostatic amplification and/or switching function.

A desirable characteristic of such valves, particularly in functions increasingly common in automation, where the control signal emanates from a computer or other electronic equipment, is that the least possible signal power input be required reliably to exercise the desired control function. Two characteristics in particular of conventional hydraulic valves tend to cause problems in meeting these requirements. Firstly, the hydrostatic pressures acting within the valve structure may generate resultant mechanical forces tending to oppose valve operation during certain phases of its operation. Secondly, the necessity for effective sealing introduces a requirement for very close manufacturing tolerances and/or sliding seal surfaces which introduce both a substantial and not entirely predictable degree of friction and a potential reliability problem.

The most usual solution of the first problem has been to employ valves of the spool type, in which valve members of "spool" shape shuttle back and forth in a bore in a valve housing. The spools and the valve ports in the wall of the bore can be designed so that resultant axial forces due to unbalanced hydrostatic forces can be substantially limited. However, if the problems occasioned by sliding seals are to be avoided, a very close fit is required between the spool and the bore, typically of the order of 8 microns. This makes such valves unduly sensitive to the slightest amount of dirt in the fluid, and the presence of such dirt can render the behaviour of such valves unacceptably erratic. Moreover the close tolerances result in high manufacturing costs, and it is difficult to provide for verification of correct operation of the valve.

An alternative form of valve uses a different approach to balancing the hydrostatic forces on the valve member, and employs a plug rotatable in a bore in a stationary casing. Ports in the wall of the bore and fluid passages formed in the plug are arranged symmetrically in pairs or other groupings so the radial hydrostatic forces acting on the plug are balanced. Such a valve would be well suited for operation by a rotary actuator were it not for the problem presented by sealing of the valve. It is difficult to provide a reliable seal between relatively rotating parts which will withstand high pressure and not introduce excessive friction. O-rings commonly do not stand up well to this type of usage, and other commonly used forms of seals are unsuitable for use at high pressures. Moreover the valve plug develops an unbalanced axial thrust which must be sustained whilst maintaining correct axial positioning of the plug.

It has been proposed in a valve of this rotary type, intended for use in a power steering system, to facilitate manufacture by forming the plug and the associated bore in the outer member with complementary tapers. Such an arrangement is disclosed in U.S. Pat. No. 4,272,056 issued June 9, 1981 to Komamura et al. The taper facilitates formation of the fluid passages in the plug during a moulding operation, and the taper used is sufficient that the necessary passages can be moulded in without obstructing withdrawal of the plug from the mould. Since the nature of the application of the valve described entails that ample torque is available to actuate the valve, and the application also requires the presence of ample thrust bearings to sustain the steering effort, the unbalanced axial hydrostatic force developed on the valve plug is immaterial, whilst the sealing problems are no different from those with a conventional balanced rotary valve.

U.S. Pat. No. 3,110,322 discloses a further valve of the same rotary type, again using a tapered plug in a tapered bore. An adjustable taper roller thrust bearing is provided to sustain the unbalanced axial force acting on the valve plug, and since an apparently robust motor drive is shown for operating the valve, no apparent attempt has been made to minimize friction. As in the case of the Kokamura et al patent, several high pressure rotary seals are required.

It is the objective of the present invention to provide a valve mechanism suitable for use in the type of application discussed, in which the development of hydrostatic forces tending to interfere with operation of the valve can be substantially eliminated, in which friction resistance to movement of the valve member can be substantially eliminated, which can be manufactured using less critical tolerances and be less sensitive to fluid contaminants than a spool valve of comparable performance, and which can be implemented without using high pressure rotary seals.

Accordingly the invention provides, in a balanced hydraulic valve structure of the type comprising a stationary member and a rotatable plug received in a bore defined in the stationary member, wherein valving is achieved by establishing selective communication between valve ports opening into the bore defined by the stationary member through cavities formed in the plug, the ports and cavities being arranged so that there is substantial cancellation of radially acting hydrostatic forces acting on the plug, and the plug and the bore being provided with complementary tapers; the improvement wherein a variable leakage path is defined between the plug and the bore of a magnitude determined by their relative axial position; linear actuator means is provided to sustain unbalanced axial hydrostatic forces acting on the tapered plug; and means are provided to sense movement of the plug and to establish a negative feedback loop to said linear actuator means whereby to cause the latter to oppose movements of the plug tending to alter the leakage path from a nominal value corresponding to an equilibrium position of the plug relative to the bore. Preferably the linear actuator means comprises a piston and cylinder device having a cylinder divided into two chambers by an axially movable piston, one chamber being in communication with a source of pressurized fluid, and the movement sensing means establishes communication of the other chamber with said leakage path and restricted communication with said source of pressurized fluid whereby a change in differential pressure in the chambers results in an axial resultant force acting between the piston and cylinder in such a sense as to tend to change the leakage path to oppose said change in differential pressure. In one preferred arrangement, the piston and the rotatable plug are integral and the cylinder chambers are formed at either end of the bore.

Preferably the valve is contained within a fluid tight housing defining said cylinder chambers as relatively low pressure regions receiving escaping fluid at each end of the integral piston and valve plug, and a rotor of a rotary actuator for the plug is also contained within the housing and connected to the plug. In one embodiment a torsion spring is connected between the plug and the housing tending to return the plug to a reference position whereby the position of the plug is rendered dependent upon the torque applied thereto by the actuator.

Further features of the invention will be apparent from the following description of exemplary preferred embodiments thereof with reference to the accompany drawings, in which:

FIG. 4 is a diagrammatic longitudinal cross-section of a further embodiment of the invention, illustrating certain features of its operation;

FIG. 5 is a more detailed view of the rotor of the embodiment of FIG. 4;

FIG. 6 is a longitudinal section through one side of a stationary member defining a tapered bore of the embodiment of FIG. 4;

Figure 1:
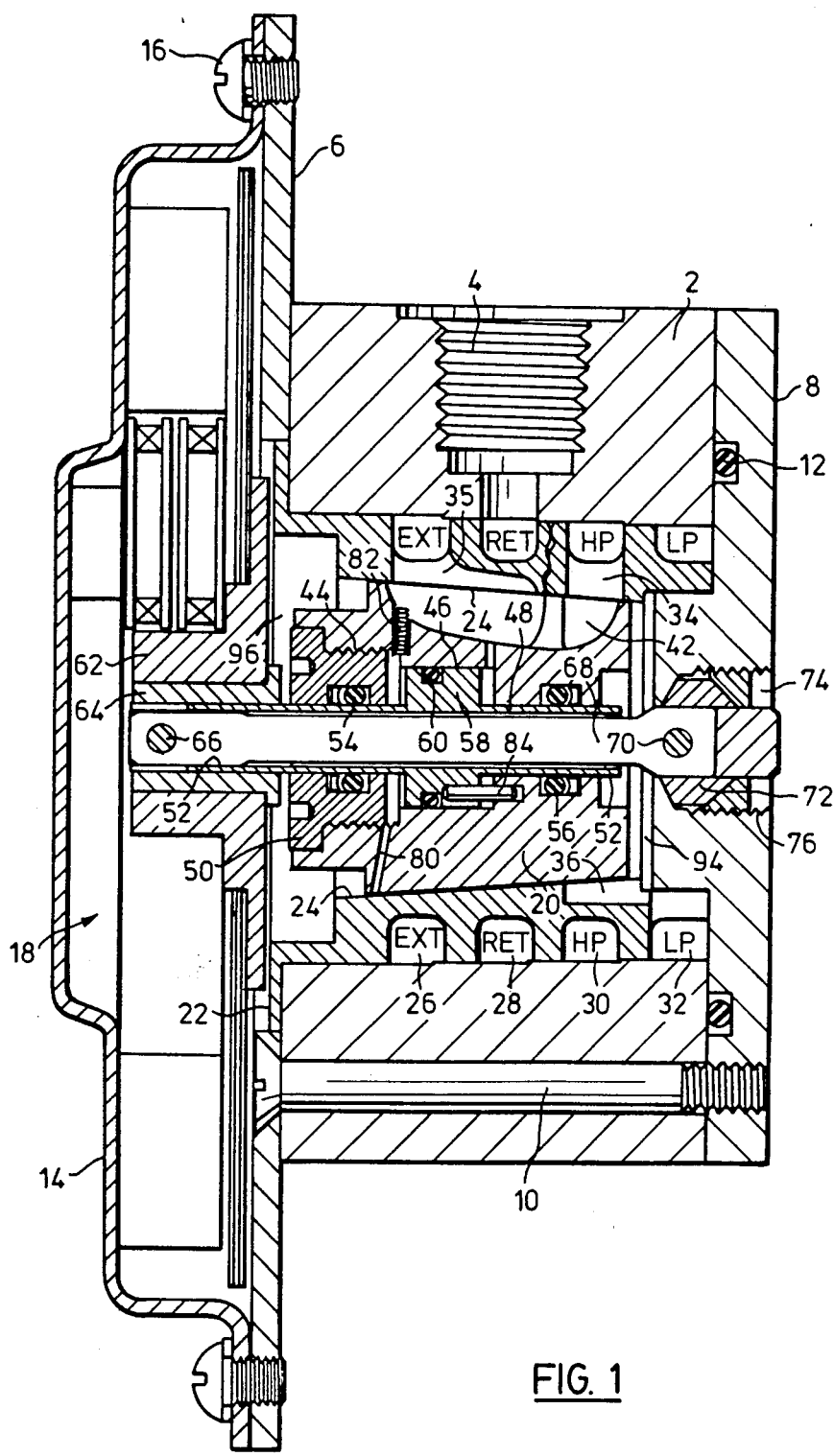
FIG. 1 is an axial section through a valve in accordance with the invention, with the lower half taken on a radial plane at an angle of 135° to the plane of the top half.

Referring to FIG. 1, the valve comprises a hollow cylindrical body 2 having threaded bores 4 (of which only one is shown) for receiving unions to pipes of a hydraulic system in which the valve is incorporated. The cylinder has end plates 6, 8 attached thereto by through bolts 10, a seal between the parts being provided by O-rings as at 12 or gaskets, not shown. A cover 14 attached by screws 16 to the end plate 6 provides a closed housing for an actuator indicated generally by 18.

A stationary member 20 of the valve is received within the body 2, being generally cylindrical with an outwardly extending radial flange 22 at one end and an axial bore 24 tapering towards the other end. The flange 22 fits within an opening in the plate 6 against an end surface of the body 2, and the other end of the member 20 abuts against the plate 8. The outer surface of the member 20 is formed with a number of axially spaced peripheral channels 26, 28, 30, 32, corresponding in number to and in connection with the bores 4. In the example shown the channels are in communication respectively with the "extend" and "retract" ports of a double acting hydraulic actuator, and with the high pressure supply and low pressure between lines of a source of pressurized hydraulic fluid. The channels are in communication with ports such as 34, 35, 36 formed in the tapered bore 24 of the member 20.

Within the bore 24 is a rotatable frustoconical plug 40 with a taper complementary to that of the bore 24. In the surface of the plug 40 are machined a number of channels, passages or pockets such as 42 (only one is shown) which selectively establish communication between ports such as 34, 35 in the member 2. The passages and ports are arranged, typically in diametrically opposed pairs, so that the hydrostatic forces developed in radial directions cancel out, and the plug is not forced against the wall of the bore. The taper of the plug will result in there being a resultant force tending to force the plug out of the bore, but this is usefully exploited in a manner to be described.

The plug 40 is formed with a stepped bore comprised of first, second and third sections 44, 46 and 48. The first and largest bore is internally screw threaded and closed by a screw plug 50 formed with an axial bore of the same diameter as the section 48. A tubular member 52 passes through all three bore sections, and is sealed for relative axial movement with the bore in plug 50 and the bore section 48 by O-rings 54 and 56 located by annular recesses within these bores. An enlarged diameter portion of the member 52 forms a piston 58 axially movable within the cylinder formed by the section 46. An O-ring 60 forms a seal for the piston 58. The tubular member 52 is anchored at one end to a rotor 62 and to a sleeve 64 by a pin 66 so as to rotate therewith but is restrained against axial movement by a resilient steel plate 68 locked to the sleeve 64 and passing longitudinally through the bore of the member 62 and locked at its other end to the plate 8 by a pin 70 passing through the blade and a nipple 72 locked by a threaded retainer 74 within a threaded bore 76 in the plate 8. The blade not only axially restrains the tubular member 52, but also forms a torsion spring tending to return the member 52 to a predetermined angular position relative to the stationary member 20. This also results in the plug 40 being so positioned, since it is constrained to rotate with the member 52 by one or more pins 84 extending parallel to the axis of the valve and engaging bores in both the piston 58 and the plug 40.

Figure 2:
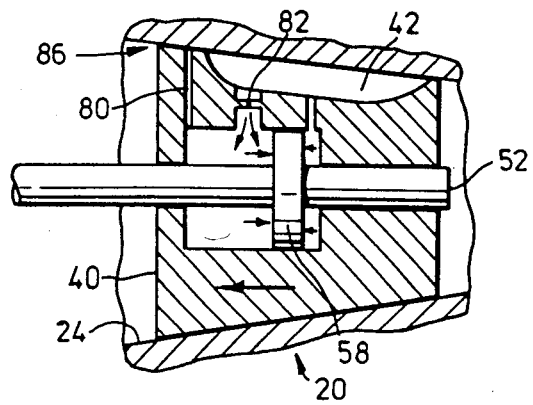
FIGS. 2 and 3 are explanatory diagrams illustrating operation of the valve.
Figure 3:
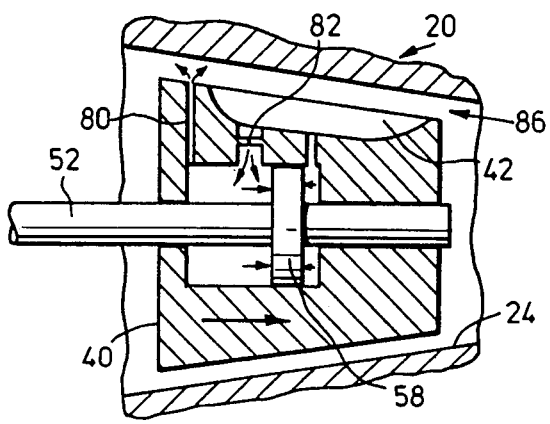

The chamber found in the bore 66 on the side of the piston 58 nearer the smaller end of the plug is placed into communication with a portion of the channel 42 which is in continuous communication by a passageway 78 with the high pressure hydraulic fluid supply through the port 34, whilst the chamber formed in the bore 46 on the other side of the piston 58 is in communication with the bore within the member 20 close to the larger chamber end of the plug 40 through a passage 80, as well as with the channel 42 through a bleed orifice 82 formed by the thread of a screw inserted in a drilling formed in the member 40. The pressure on the other side of the piston 58 is thus a proportion of the pressure within the channel 42 which depends upon the rate at which fluid can escape through the passage 80. This in turn is controlled by the clearance 86 between the bore 24 and the plug 40, which restricts the rate at which fluid can escape from bore 80 and which in turn depends upon the axial position of the plug. The operation is described further with reference to FIGS. 2 and 3.

Supposing that the clearance between the bore 24 and the plug 40 is too small (FIG. 2), then the exit from the bore 80 is heavily choked and the pressure on the left-hand (as shown) side of the piston 58 will rise towards that on the right hand side of the piston. This will reduce the resultant force developed within the bore 46 in opposition to the axial resultant force occasioned by the taper of the plug, resulting in the plug tending to move to the left. This will tend to reduce the choking of the exit of the passage 80, causing the pressure to the left of the piston 58 to fall and thus increasing the force resisting expulsion of the plug from the bore 24. If the clearance between the plug 40 and the bore 24 is too large, the pressure to the left of the piston will fall, and the increased pressure differential across the piston will produce a force tending to move the plug to the right, thus reducing the clearance. In other words, a negative feedback loop is established which controls and stabilizes the axial position of the plug within the bore. The bleed orifice 82 is calibrated so that the clearance between the plug and the bore is stabilized at a low figure permitting a controlled amount of leakage past the plug into the low pressure zone at either end of the valve assembly. The dynamically controlled clearance between the plug and the stationary member avoids the necessity for maintaining very tight tolerances during machining, and renders the valve less prone to malfunction due to dirt, since abrupt changes in the pressure applied to the valve will cause axial movement of the plug to allow dirt particles to be flushed out.

The rotary actuator 18 for the valve contained within the cover 14 may be of any suitable type, its output torque being matched to that necessary to overcome that developed by the blade 68 as the plug 40 rotates. The plug 40 is subject to virtually no frictional resistance as it rotates, since it is suspended on a film of escaping fluid passing between the plug 40 and the stationary member 20. The only seals associated with the plug are those acting on the tubular member 52, which rotates with the plug. These seals 54, 56 are therefore required to sustain only the small axial movements needed to adjust the clearance between the plug and the stationary member. All of the other seals in the unit are stationary. The feedback control of the plug clearance means that leakage through this can be controlled to an acceptable level such that the loss of efficiency in the valve is small. In many applications this loss will be greatly outweighed by the advantages gained in the reduced power required for actuation due to elimination of friction, reduced sensitivity to dirt, and wider permissible manufacturing tolerances.

Furthermore, the valve described has a subtantial advantage as compared with conventional spool valves in that it is easy to provide for external verification of its operation, simply by making provision for determining the angular position of the rotor 62. A window or transparent cover may be provided for visual or electro-optical verification of the angular position of the valve plug 40, or a magnetic coupling may be made through the cover to an external flag or other indicating device. The rotor 62 may be actuated either by internal means, such as an electromagnet coil 90 and rotor disc 92 as shown, or some alternative form of electromagnetic actuator, or by magnetic coupling to an external actuating device. Since the cover 14 is not normally under high pressure, there is no particular difficulty in sealing an external mechanical drive through the cover without significant frictional losses.

Numerous variations and modifications are possible in the exemplary arrangement described. The blade 68 or alternative torsion spring may be omitted if it is not required to provide a home position of the plug, or if proportional operation is not required. In this case, an alternative arrangement such as end bearings will be required to restrain the member 52 against axial motion whilst permitting rotation. The number and location of the valve ports may be varied according to requirements, as long as a low pressure connection is made to zones 94, 96 to either end of the plug to drain fluid leaking past the plug. Other forms of negative feedback systems may be utilized to control the axial position of the plug within the stationary member. For example, the plug 40 could be supported by a thrust bearing on the end plate 8, and its axial position controlled by a linear hydraulic actuator housed in the end plate, the actuator being connected to the high pressure supply and a port into the clearance between the stationary member and the plug. Alternatively the actuator could be controlled by sensing the rate of flow of fluid from the zones 94, 96 and/or the actuator itself could be other than hydraulic. For example, the exhaust from zones 94, 96 could be choked to provide a pressure in those zones proportional to the rate of leakage, and a pressure transducer provided to generate an electrical signal proportional to this pressure which in turn controls an electrical actuator adjusting the axial position of a thrust bearing sustaining the axial thrust from the plug 40. An all hydraulic feedback arrangement will however usually be simpler to implement.

Whilst the embodiment described monitors the relative axial positions of the plug in the bore of the stationary member by sensing the rate of leakage through the gap between the two parts, other means of sensing could be utilized. The width of the gap could for example be determined by sensing changes in the electronic capacitance of the capacitor formed by the two parts (assuming their electrical isolation) by inductive means, or by sensing the properties of a magnetic circuit formed by the two parts. Alternatively, axial displacement of the plug can be sensed to provide the feedback signal.

A more developed version of the valve is now described with reference to FIGS. 4 through 9, which exhibits a number of refinements as compared with the previous embodiments, with a view to obtaining still better balanced operation, and still further reducing the operating torque required, whilst simplifying construction.

In this embodiment, the piston and cylinder separately formed within the plug are dispensed with, and instead the piston is formed by the plug 140, and the bore 124 forms an integral part of the cylinder which has end chambers at either end of the piston formed by the plug. The axial position of the plug is maintained by opposed thrusts exerted by fluid under pressure in the two chambers 194 and 196. Rotation of the plug is achieved by a rotor 162 of a rotary actuator which is enclosed within the chamber 196. Use of an electromagnetic actuator having a soft iron or permanent magnet rotor without windings eliminates the need for brushes, slip rings or external connections, and makes it readily possible to construct the chamber 196 to withstand substantial pressures. Means are also provided to sense the angular position of the rotor, which may comprise a segmental plate 200 attached to the end of the plug remote from the rotor, and stationary segmental plates 202 between which the plate 200 moves as the plug rotates. The capacitance formed by the plates is externally measured through suitable connections to determine the position of the rotor. A torsion spring similar to that in the first embodiment may be provided to control rotation of the plug, and can provide an external, electrical connection to the plate 200.

In order to provide more precise centering of the plug 140 in the bore 124, and to control the supply of fluid from a high pressure source to the chambers 194 and 196, the plug is supported in the bore by two axially spaced rings of hydrostatic bearing pads 204 and 206 formed by shallow recesses formed in the surface of the plug 140 towards each end. These recesses are separated from the ends of the tapered surface of the plug by narrow lands 208, 210 and by somewhat wider lands 212, 214 from peripheral drain grooves 216 and 218, the differential width of the lands having the result that the majority of leakage from the pads is in axially outward directions. The pads are supplied with high pressure fluid in a manner described further below. Fluid entering the chamber 196 as a result of such leakage can only leave the chamber through a passageway 180 which extends from the end surface of the piston formed by the body which also forms the motor rotor. A variable restriction 182 is located in the passage 180 so as to adjust the build up of pressure in chamber 196 due to leakage from the pads 206 past the land 210. This leakage will be dependent on the clearance between the land 210 and the bore 124 which in turn is dependent upon the axial position of the plug 140 in the bore. Similarly the leakage past the land 208 into chamber 194 will be dependent on the axial position of the plug, and if the fluid leaving chamber 194 were similarly restricted then there might be no substantial change in the differential pressure acting on the end of the plug. In order to avoid this problem, the chamber 194 is vented to the groove 216 via passages 219 through the plug which terminates in the arches of small circular lands 220 surrounded by moats 222 connected by axially extending grooves 224 to the groove 216. The leakage across the lands 220 between the passages 219 and the moats 222 will be proportional to the clearance between the plug 140 and the bore 124 and thus the restriction placed on the exit of fluid from the chamber 194 will be dependent on the axial position of the plug 124.

Figure 7:
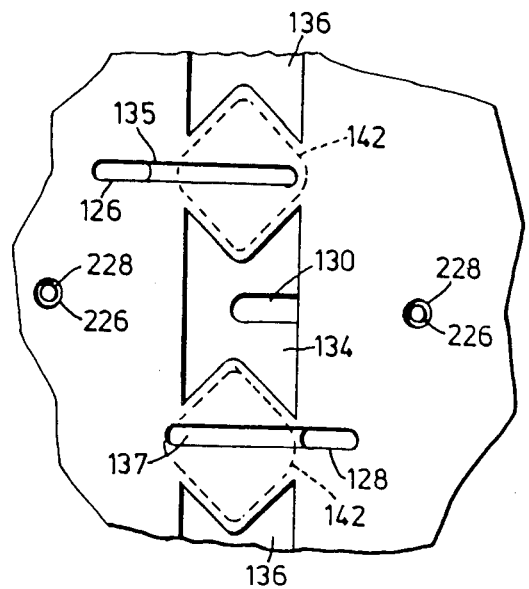
FIG. 7 is a planar development of a portion of the inner peripheral surface of the stationary member, illustrating the arrangement of ports therein.
Figure 8:
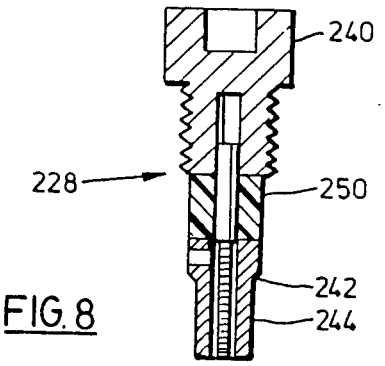
FIG. 8 is a cross-section on an enlarged scale of one of the flow restrictors shown in FIG. 6.

As best seen in FIG. 6, which is an axial section through one wall of the bore 124, and shows a member 120 defining the bore 124, accommodated within a cylindrical housing 102. The member 120 also defines gallery 130 for high pressure fluid, galleries 126 and 128 for extension and return connections to a double acting actuator being controlled, and gallery 132 for low pressure exhaust fluid, each gallery having appropriate external connections (not shown). The high pressure gallery 130 is connected to chambers 224. Referring also to FIG. 7, the galleries 126 and 128 are connected to ports 135, 137, the gallery 130 to ports 134 and the gallery 132 to ports 136, all in the bore 124. The chambers 224 are also connected to the bore 124 by bores 226 containing hydraulic impedances 228 described further below with reference to FIG. 9, and which reduce the pressure of the fluid reaching the inner ends of bores 226.

The bores 226 are aligned with the hydrostatic pockets 204 and 206 (see FIGS. 4 and 5) so as to maintain fluid pressure therein, while the ports 135 and 137 are axially aligned and have a comparable axial extent to pockets 142 (see FIGS. 4 and 5) formed in the rotor 140. The ports and pockets are however shaped so as to minimise the development of unwanted forces on the rotor during passage of fluid between the various ports.

Thus the pockets 142 and certain of the ports, preferably the high and low pressure ports 134 and 136 are contoured so as to reduce the development of such forces. In the embodiment shown the pockets 142 are of generally diamond shape with a central axis 230 extending in the axial direction of the plug and tapering extensions 232 extending peripherally around the plug in both directions from the channel. The ports 134 and 136 also have central axes 234 extending in the axial direction and tapered peripheral extensions, but in this case the extensions 238 are bifurcated and chevroned so as to complement the configuration of the extensions. The pockets and ports interact during use as discussed further below.

Referring to FIG. 9, each hydraulic impedance 228 comprises a socket screw 240 which is screwed into the housing 102 so as to press a conical seat 242 on an impedance housing 244 into sealing engagement with the radially outer end of the associated bore 226. The screw 240 has a central bore in which is secured an inner end of an impedance rod 246 having a threaded outer end portion 248 extending into a longitudinal bore in the impedance housing 244. A spacer 250 of resilient synthetic plastic material such as nylon is fitted between the screw and the housing 244. A side bore in the impedance housing communicates within the chamber 224 (FIG. 6). The threads on rod portion 248 are calibrated so as to provide in conjunction with the impedance housing a desired degree of restriction of flow between the chamber 224 and the radially inward end of the bore 226. The rod 246 is longitudinally positioned by the collar 250.

It will be understood that each of the ports and pockets so far described will be one of a set, generally of two, ports or pockets distributed symmetrically around the periphery of the bore 124 or the plug 140 as the case may be. By suitable shaping of the pockets and ports it can be arranged that the hydrodynamic forces generated by the velocity of the flow in and out of the ports can be maintained substantially balanced despite changes in velocity and angle of flow as the rotor rotates and despite the use of pockets and ports of generous area. The complementary outlines and shaping of the pockets and certain of the ports can thus provide rapid opening and closing of the valve without the development of large transient forces on the rotor.

The arrangement of the ports and pockets in a ring, and their axial symmetry, rather than their being spaced longitudinally of the rotor, as in the previous embodiment, prevents the development of longitudinal reaction forces by fluid flow through the valve during opening and closing.

The embodiments of the invention in which an exclusive property or privilege is claimed are defined as follows:

1. In a balanced hydraulic valve structure of the type comprising a stationary member and a rotatable plug received in a bore defined in the stationary member, wherein valving is achieved by establishing selective communication between valve ports opening into the bore defined by the stationary member through cavities formed in the plug, the ports and cavities being arranged so that there is substantial cancellation of radially acting hydrostatic forces acting on the plug, and the plug and the bore being provided with complementary tapers; the improvement wherein a variable leakage path is defined between the plug and the bore of a magnitude determined by their relative axial position; linear actuator means is provided to sustain unbalanced axial hydrostatic forces acting on the tapered plug; and means are provided to sense movement of the plug and to establish a negative feedback loop to said linear actuator means whereby to cause the latter to oppose movements of the plug tending to alter the leakage path from a nominal value corresponding to an equilibrium position of the plug relative to the bore.

2. A balanced hydraulic valve structure according to claim 1, wherein the linear actuator means comprises a piston and cylinder device having a cylinder divided into two chambers by an axially movable piston, one chamber being in communication with a source of pressurized fluid, and the movement sensing means establishes communication of the other chamber with said leakage path and restricted communication with said source of pressurized fluid whereby a change in differential pressure in the chambers results in an axial resultant force acting between the piston and cylinder in such a sense as to tend to change the leakage path to oppose said change in differential pressure.

3. A valve structure according to claim 2, wherein the cylinder is formed within the plug, and the piston is mounted on a shaft passing through the plug, the shaft being restrained against axial movement relative to the stationary member but constrained to rotate with the plug member.

4. A valve structure according to claim 3, wherein a duct extends between one chamber defined within the cylinder and a passage in the plug which is in communication with a high pressure fluid port in the stationary member, a restricted duct extends between the other chamber defined within the cylinder and said passage, and a further duct extends between the other chamber and the leakage path, the restricted duct being calibrated so that the magnitude of the leakage path is maintained substantially at a predetermined level.

5. A valve structure according to claim 3, wherein the shaft is tubular, and its axial position is maintained and its rotation with the plug member from a rest position is opposed by a torsion spring passing through said shaft and attached at one end to the shaft and at the other end to an anchorage fixed in relation to the stationary member.

6. A valve structure according to claim 1, further comprising a closed housing containing the valve structure, and including a low pressure fluid connection to zones at each end of the plug member which receive fluid escaping through said leakage path.

7. A valve structure according to claim 6, wherein the housing further contains an actuator rotor coupled to the rotatable plug.

8. A valve structure according to claim 2, wherein the piston and the rotatable plug are integral, and further comprising a closed housing containing the valve structure and defining the cylinder with the chambers at either end of said integral piston and plug.

9. A valve structure according to claim 8, wherein the rotatable plug is formed at either end with rings of hydrostatic bearing pads facing the bore, wherein means are provided to feed fluid from the source of pressurized fluid to said rings of pads, wherein said chambers in the cylinder are placed in restricted communication with the source of pressurized fluid though leakage from said pads, and wherein conduit means in said integral piston and plug place one of said chambers in communication with a leakage path to a low pressure zone, said leakage path being defined between said plug and said bore.

10. A valve structure according to claim 9, wherein the cavities are formed in the periphery of the plug between the two rings of bearing pads, and annular drainage grooves in communication with a low pressure zone are located between the rings of pads and the cavities.

11. A valve structure according to claim 10, wherein the leakage path extends between at least one passage from said one chamber to an orifice in a land formed in the surface of the plug, and a moat surrounding the land and connected to one of said drainage grooves.

12. A valve structure according to claim 10, wherein the surface of the plug defines inner annular lands between the grooves and the rings of pads, and outer annular lands between the rings of pads and the ends of the plugs, the outer annular lands being narrower than the inner annular lands.

13. A valve structure according to claim 8, including means for determining the angular position of the plug, said means comprising a variable capacitor having a movable plate mounted for rotation with the plug, and stationary plate mounted within one of said chambers adjacent the movable plate.

14. A valve structure according to claim 1, wherein the ports in the bore which are placed in communication by a cavity in the plug are peripherally adjacent such that flow between them is circumferential.

15. A valve structure according to claim 14, wherein the cavities in the plug and at least alternate ports are integrally contoured so that as such a pair of ports moves into communication with a cavity on rotation of the plug, the hydrodynamic forces developed on the plug by the velocities of flow into and out of said ports remain substantially balanced.

16. A valve structure according to claim 14, wherein the cavities are lozenge shaped with an axis extending longitudinally of the plug, and the ports have axes extending longitudinally of the sleeve, alternate ports having bifurcate peripheral extensions tapering in width and depth, and of complementary outline to the extensions of the cavities.

* * * * *